United States Patent
Suzuki et al.

(10) Patent No.: US 8,847,539 B2
(45) Date of Patent: Sep. 30, 2014

(54) SERVOMOTOR DRIVE DEVICE THAT DRIVES SERVOMOTOR CONNECTED TO ROTATING SHAFT

(71) Applicant: FANUC Corporation, Yamanashi (JP)

(72) Inventors: Naoyuki Suzuki, Yamanashi (JP); Yasuyuki Matsumoto, Yamanashi (JP)

(73) Assignee: FANUC Corporation, Yamanashi (JP)

( * ) Notice: Subject to any disclaimer, the term of this patent is extended or adjusted under 35 U.S.C. 154(b) by 3 days.

(21) Appl. No.: 13/660,221

(22) Filed: Oct. 25, 2012

(65) Prior Publication Data
US 2013/0113411 A1    May 9, 2013

(30) Foreign Application Priority Data
Nov. 8, 2011    (JP) .................................. 2011-244769

(51) Int. Cl.
*G05F 1/08*       (2006.01)
*H02P 23/06*    (2006.01)
*H02P 3/22*      (2006.01)
*H02P 3/18*      (2006.01)

(52) U.S. Cl.
CPC    *H02P 3/18* (2013.01); *H02P 23/06* (2013.01); *H02P 3/22* (2013.01)
USPC ............................ 318/681; 318/139; 318/803

(58) Field of Classification Search
USPC .......... 318/681, 139, 803, 376, 367, 378, 375
See application file for complete search history.

(56) References Cited

U.S. PATENT DOCUMENTS

2012/0086369 A1*    4/2012    Kitanaka et al. .............. 318/139

FOREIGN PATENT DOCUMENTS

| JP | 62-26192 U | 2/1987 |
|----|-----------|--------|
| JP | 5-227759 A | 9/1993 |
| JP | 7-109077 A | 4/1995 |
| JP | 2000-201492 A | 7/2000 |
| JP | 2004-154961 A | 6/2004 |
| JP | 2007-037300 A | 2/2007 |
| JP | 2011-101473 A | 5/2011 |
| JP | 2011-101474 A | 5/2011 |
| JP | 2011-161612 A | 8/2011 |

OTHER PUBLICATIONS

Office Action corresponding to JP2011-244769, dated Jan. 8, 2011.

* cited by examiner

*Primary Examiner* — Karen Masih
(74) *Attorney, Agent, or Firm* — Lowe Hauptman & Ham, LLP

(57) ABSTRACT

A servomotor drive device has a first converter, a regenerative resistor circuit having a first switching element and a regenerative resistor, a first connection part configured to connect a second converter in parallel to the regenerative resistor circuit in an attachable and detachable manner, and a first control unit configured to control the on and off states of the first switching element. The second converter has a second switching unit and a second control unit configured to return regenerative energy to an AC power source side by bringing the second switching element into the on state when the second converter is connected to the first connection part.

10 Claims, 4 Drawing Sheets

SERVOMOTOR DRIVE DEVICE THAT DRIVES SERVOMOTOR CONNECTED TO ROTATING SHAFT

RELATED APPLICATIONS

The present application claims priority from Japanese Application No. 2011-244769, filed Nov. 8, 2011, the disclosure of which is hereby incorporated by reference herein in its entirety.

BACKGROUND OF THE INVENTION

1. Field of the Invention

The present invention relates to a servomotor drive device to which the power source regeneration function to return regenerative energy generated during speed reduction of a servomotor connected to a rotating shaft of a moving part of an industrial robot to the AC power source side can be added, in accordance with operating conditions of the industrial robot.

2. Description of Related Art

Conventionally, in order to handle the regenerative energy generated during speed reduction of a servomotor, a servomotor drive device having a resistance regeneration function to consume the regenerative energy by a regenerative resistor and a servomotor drive device having the power source regeneration function to return the regenerative energy to the AC power source side are used.

The servomotor drive device having the resistance regeneration function has a converter having a plurality of diodes configured to convert an AC current from an AC power source into a DC current and to supply DC power to an inverter configured to convert DC power into AC power, and a regenerative resistor circuit having a switching element (for example, NPN transistor) and a regenerative resistor connected in series.

The servomotor drive device having a power source regeneration function has a converter that not only has a plurality of diodes but also the same number of switching elements as diodes, connected in parallel to the plurality of diodes, respectively.

The converter in the servomotor drive device having the resistance regeneration function has no switching element, and therefore, is more advantageous in downsizing of the device than the servomotor drive device having the power source regeneration function. On the other hand, the servomotor drive device having the power source regeneration function is capable of consuming a larger amount of regenerative energy than the servomotor drive device having the resistance regeneration function.

The regenerative energy generated during speed reduction of a servomotor connected to a rotating shaft of a moving part (for example, an arm) of an industrial robot is usually smaller in amount than the regenerative energy generated during speed reduction of a servomotor connected to a rotating shaft of a moving part of a machine tool or industrial machinery, and therefore, it is possible to deal with the regenerative energy by resistance regeneration. Consequently, when driving a servomotor connected to a rotating shaft of a moving part of an industrial robot, the servomotor drive device having the resistance regeneration function, which is advantageous in downsizing of the device, is generally used.

However, there is a case where the amount of the regenerative energy generated during speed reduction of a servomotor becomes larger than the amount of regenerative energy that can be handled by resistance regeneration, such as when a plurality of industrial robots is operated at the same time, when a servomotor connected to a rotating shaft of a moving part of an industrial robot and a servomotor connected to a rotating shaft of a moving part of a peripheral of the industrial robot are driven at the same time, and when a large-sized or high-speed industrial robot is operated. In this case, in order to make it possible to handle the generated regenerative energy, a servomotor drive device having both the resistance regeneration function and the power source regeneration function is used. A servomotor drive device having both the resistance regeneration function and the power source regeneration function has a converter having a plurality of diodes and switching elements in the same number as that of the plurality of diodes, and a regenerative resistor circuit.

Conventionally, as a servomotor drive device having both the resistance regeneration function and the power source regeneration function, a servomotor drive device, which performs only power source regeneration when the regenerative energy is equal to or less than a predetermined amount and performs both power source regeneration and resistance regeneration when the regenerative energy exceeds the predetermined amount, is proposed in Japanese Unexamined Utility Model Application Publication No. 62-26192 (JP62-26192U), Japanese Unexamined Patent Publication (Kokai) No. 2004-154961 (JP2004-154961A), and Japanese Unexamined Patent Publication (Kokai) No. 2011-101473 (JP2011-101473A) and a servomotor drive device, which exits power source regeneration and starts resistance regeneration when an power failure occurs, is proposed in Japanese Unexamined Patent Publication (Kokai) No. 2011-101474 (JP2011-101474).

When driving a servomotor connected to a rotating shaft of a moving part of an industrial robot, whether only the resistance regeneration function is sufficient to handle the regenerative energy or both the resistance regeneration function and the power source regeneration function are necessary to handle the regenerative energy is determined, in accordance with the operating conditions of the industrial robot, such as the number of industrial robots to be operated, the presence or absence of a peripheral to be used simultaneously with the industrial robot, and the size or speed of the industrial robot. That is, it is desirable to downsize the device by using a converter having a plurality of diodes and a regenerative resistor circuit, when only the resistance regeneration function is sufficient to handle the regenerative energy, and it is desirable to perform power source regeneration by using a converter having a plurality of diodes and switching elements in the same number as that of the diodes, and a regenerative resistor circuit, when both the resistance regeneration function and the power source regeneration function are necessary to handle the regenerative energy.

However, in the conventional servomotor drive device having both the resistance regeneration function and the power source regeneration function, a converter having a plurality of diodes and the same number of switching elements is provided in advance, and therefore, even when only the resistance regeneration function is sufficient to handle the regenerative energy, the converter having a plurality of diodes and the same number of switching elements is used. Consequently, in the conventional servomotor drive device having both the resistance regeneration function and the power source regeneration function, it is not possible to add the power source regeneration function in accordance with the operating conditions of the industrial robot.

SUMMARY OF THE INVENTION

As an aspect, the present invention provides a servomotor drive device to which the power source regeneration function can be added, in accordance with operating conditions of an industrial robot.

According to an aspect of the present invention, a servomotor drive device has a first converter having a plurality of first rectifier elements configured to convert an AC current from an AC power source into a DC current and to supply DC power to a first inverter configured to convert DC power into AC power, a regenerative resistor circuit connected in parallel to the first converter and having a first switching element and a regenerative resistor configured to consume regenerative energy generated during speed reduction of a servomotor connected in series to the first inverter and connected to a rotating shaft of a moving part of an industrial robot when the fist switching element is in the on state, a first connection part configured to connect a second converter in parallel to the regenerative resistor circuit in an attachable and detachable manner, and a first control unit configured to control the on and off states of the first switching element, the second converter has a plurality of second rectifier elements configured to convert an AC current from an AC power source into a DC current and to supply DC power to the first inverter, second switching elements in the same number as that of the plurality of second rectifier elements, connected in parallel to the plurality of second rectifier elements, respectively, and a second control unit configured to return regenerative energy to the AC power source side by bringing the second switching element into the on state when the second converter is connected to the first connection part.

In an aspect of the present invention, a servomotor drive device has a plurality of servomotor drive units and each of the plurality of servomotor drive units has a first converter having a plurality of first rectifier elements configured to convert an AC current from an AC power source into a DC current and to supply DC power to a first inverter configured to convert DC power into AC power, a regenerative resistor circuit connected in parallel to the first converter and having a first switching element and a regenerative resistor configured to consume regenerative energy generated during speed reduction of a servomotor connected in series to the first inverter and connected to a rotating shaft of a moving part of an industrial robot when the first switching element is in the on state, a first connection part configured to connect a second converter in parallel to the regenerative resistor circuit in an attachable and detachable manner, and a first control unit configured to control the on and off states of the first switching elements, the second converter has a plurality of second rectifier elements configured to convert an AC current from an AC power source into a DC current and to supply DC power to the first inverter, second switching elements in the same number as that of the plurality of second rectifier elements, connected in parallel to the plurality of second rectifier elements, respectively, and a second control unit configured to return the regenerative energy to the AC power source side by bringing the second switching element into the on state when the second converter is connected to all of the first connection parts of the plurality of servomotor drive units.

Preferably, the servomotor drive device also has a second connection part configured to connect to the rotating shaft of the servomotor connected to the second inverter configured to convert DC power into AC power and connected to the rotating shaft of the peripheral of an industrial robot, in an attachable and detachable manner.

Preferably, the first control unit keeps the first switching element in the off state and the second control unit keeps the second switching element in the on state if the second converter is connected to the first connection part and voltage across both ends of the first inverter or the voltage across both ends of the second converter is between a first voltage, which exceeds the voltage immediately after the speed reduction of the servomotor is started and is lower than a voltage of destruction level of an element included in the servomotor drive device, and a second voltage, which exceeds the first voltage and is lower than the voltage of destruction level.

Preferably, the first control unit keeps the first switching element in the on state and the second control unit keeps the second switching element in the on state until the voltage across both ends of the first inverter or the voltage across both ends of the second converter exceeds the second voltage and then the voltage reaches the voltage of destruction level.

Preferably, the second control unit brings the second switching element into the off state if the disconnection of a contactor arranged between the AC power source and the second converter is detected while the second converter returns the regenerative energy to the AC power source side.

According to an aspect of the present invention, the second converter configured to return the regenerative energy to the AC power source side is attached to the servomotor drive device in an attachable and detachable manner through the first connection part, and therefore, it is possible to add the power source regeneration function in accordance with the operating conditions of an industrial robot.

BRIEF DESCRIPTION OF THE DRAWINGS

The objects, features, and advantages of the present invention will be clear by the description of the following embodiments relating to the accompanying drawings. In the drawings.

DETAILED DESCRIPTION

Figure 1:
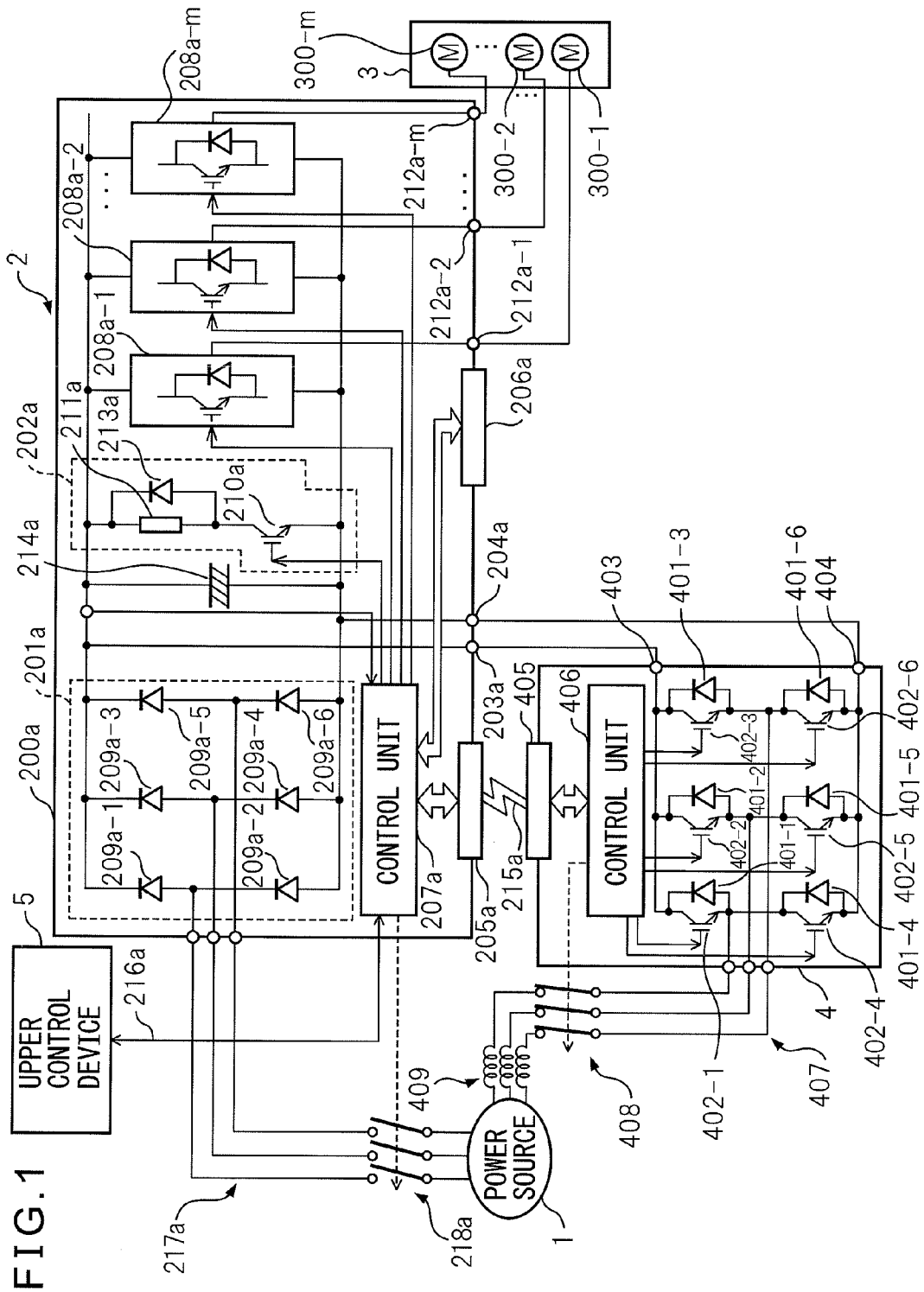
FIG. 1 is a block diagram of a system having a servomotor drive device of a first embodiment of the present invention.

Embodiments of the servomotor drive device according to the present invention are explained with reference to the drawings. In the drawings, the same symbol is attached to the same component.

Referring to the drawings, FIG. 1 is a block diagram of a system having a servomotor drive device of a first embodiment of the present invention. The system shown in FIG. 1 is used to drive a servomotor connected to a rotating shaft of a moving part of an industrial robot, and the system has a three-phase AC power source 1, a servomotor drive device 2, an industrial robot 3, a converter 4 as a second converter, and an upper control device 5.

In the present embodiment, the servomotor drive device 2 consists of one servomotor drive unit 200a. The servomotor drive unit 200a has a converter 201a as a first converter, a regenerative resistor circuit 202a, connectors 203a, 204a and multi-pin connectors 205a, 206a such as 8-pin connectors which constitute a first connection part (interface), and a control unit 207a.

The converter 201a has six diodes 209a-1, 209a-2, 209a-3, 209a-4, 209a-5, and 209a-6 bridge-connected as a plurality of first rectifier elements configured to supply DC power to the number m (m is an arbitrary natural number) of inverters 208a-1, 208a-2, . . . , 208a-m connected in parallel with one another as a first inverter. Each of the inverters 208a-1, 208a-2, . . . , 208a-m converts DC power supplied from the converter 201a into AC power.

The regenerative resistor circuit 202a is connected in parallel to the converter 201a and has an NPN transistor (IGBT) 210a, which is a feedback transistor, as a first switching element and a regenerative resistor 211a. The regenerative resistor 211a consumes regenerative energy generated during speed reduction of servomotors 300-1, 300-2, . . . , 300-m connected to a rotating shaft of a moving part (for example, an arm) of the industrial robot 3 when the NPN transistor 210a is in the on state. The servomotors 300-1, 300-2, . . . , 300-m are connected in series to the inverters 208a-1, 208a-2, . . . , 208a-m, respectively, via connectors 212a-1, 212a-2, . . . , 212a-m. In the present embodiment, a diode 213a is connected in parallel to the regenerative resistor 211a, and a smoothing capacitor 214a is connected in parallel to the converter 201a.

The connectors 203a, 204a are configured so that two pins (not shown schematically) provided on the DC current output side of the converter 4 can be attached and detached, and when these two pins are inserted into the connectors 203a and 204a, respectively, the DC power supplied from the converter 4 is supplied to the inverters 208a-1, 208a-2, . . . , 208a-m side. The multi-pin connectors 205a, 206a are used to connect to other members through a multi-core cable. In the present embodiment, the multi-pin connector 205a connects the servomotor drive unit 200a to the converter 4 through a multi-core cable 215a to enable transmission and reception of data between the control unit 207a and the converter 4.

The control unit 207a transmits and receives data to and from the upper control device 5 through an optical cable 216a and in addition thereto, the control unit 207a transmits and receives data to and from the converter 4 through the multi-pin connector 205a, and controls the on and off operation of the NPN transistor 210a, the drive of the inverters 208a-1, 208a-2, . . . , 208a-m, and the on and off operation of a switch 218a arranged in a line 217a between the three-phase AC power source 1 and the converter 201a. To do this, the control unit 207a is implemented by a processor including an input/output port, a serial communication circuit, a comparator, etc., and performs various kinds of processing of the servomotor drive unit 200a in accordance with processing programs stored in a memory, not shown schematically. In the present embodiment, the control unit 207a detects the voltage across both ends of the smoothing capacitor 214a, i.e., the DC link voltage, in order to detect the voltage across both ends of the converter 4, the voltage across both ends of the converter 201a, or the voltage across both ends of the inverters 208a-1, 208a-2, . . . , 208a-m.

The converter 4 can be attached to and detached from the connectors 203a, 204a and the multi-pin connectors 205a and 206a and converts an AC current from the AC power source 1 into a DC current. To do this, the converter 4 has six diodes 401-1, 401-2, 401-3, 401-4, 401-5, and 401-6 bridge-connected as a plurality of second rectifier elements configured to supply DC power to the inverters 208a-1, 208a-2, . . . , 208a-m, NPN transistors 402-1, 402-2, 402-3, 402-4, 402-5, 402-6 as a second switching element connected in parallel to the diodes 401-1, 401-2, 401-3, 401-4, 401-5, and 401-6, respectively, a connector 403 corresponding to the connector 203a, a connector 404 corresponding to the connector 204a, a multi-pin connector 405 configured to connect to the multi-pin connector 205a through the multi-core cable 215a, and a control unit 406 as a second control unit.

When the regenerative energy generated during speed reduction of a servomotor is larger than the regenerative energy that can be handled by resistance regeneration, such as when a plurality of industrial robots is operated at the same time, when a servomotor connected to a rotating shaft of a moving part of an industrial robot and a servomotor connected to a rotating shaft of a moving part of a peripheral of the industrial robot are driven at the same time, and when a large-sized or high-speed industrial robot is operated, the converter 4 is attached to the servomotor drive device 2. In contrast to this, when the regenerative energy generated during speed reduction of a servomotor is equal to or less than the regenerative energy that can be handled by resistance regeneration, such as when a single industrial robot is operated, which is not a large-sized one or high-speed one, the converter 4 is not attached to the servomotor drive device 2.

The control unit 406 transmits and receives data to and from the control unit 207a through the multi-pin connector 405, and controls the on and off operation of the NPN transistors 402-1, 402-2, 402-3, 402-4, 402-5, 402-6 and the on and off operation of a switch 408 arranged in a line 407 between the three-phase AC power source 1 and the converter 4. The line 407 has a reactor 409. To do this, the control unit 406 is implemented by a processor including an input/output port, a serial communication circuit, a comparator, etc. and performs various kinds of processing of the converter 4 in accordance with processing programs stored in a memory, not shown schematically.

The upper control device 5 consists of a CNC (computer numerical control), etc., and inputs various kinds of commands to the control unit 207a through the optical fiber 216a and receives data from the control unit 207a through the optical fiber 216a.

When the converter 4 is not attached to the servomotor drive device 2, the control unit 207a detects the state where the converter 4 is not connected to the multi-pin connector 205a. Then, at the time of driving of the servomotors 300-1, 300-2, . . . , 300-m, the control unit 207a brings the switch 218a into the on state in accordance with a command from the upper control device 5. Due to this, the converter 201a converts an AC current from the three-phase AC power source 1 into a DC current and supplies DC power to the inverters 208a-1, 208a-2, . . . , 208a-m.

When the servomotors 300-1, 300-2, . . . , 300-m are driven to reduce speed in the state where the converter 4 is not attached to the servomotor drive device 2, the control unit 207a brings the NPN transistor 210a into the on state. Due to this, the regenerative resistor 211a consumes the regenerative energy generated during speed reduction of the servomotors 300-1, 300-2, . . . , 300-m.

When the converter 4 is attached to the servomotor drive device 2 via the connectors 203a, 204a and the multi-pin connectors 205a, 206a, the control unit 207a detects the state where the converter 4 is connected to the multi-pin connectors 205a, 206a. Then, at the time of driving of the servomotors 300-1, 300-2, . . . , 300-m, the control unit 207a brings the switch 218a into the off state in accordance with a command from the upper control device 5, and the control unit 406 brings the switch 408 into the on state in accordance with data from the control unit 207a. Due to this, the converter 4 converts an AC current from the three-phase AC power source 1 into a DC current and supplies DC power to the inverters 208a-1, 208a-2, . . . , 208a-m.

When the servomotors 300-1, 300-2, ..., 300-*m* are driven to reduce speed in the state where the converter 4 is attached to the servomotor drive device 2, the control unit 207*a* monitors the DC link voltage of the servomotor drive unit 200*a*.

When the DC link voltage exceeds a voltage V1 as a first voltage lower than the destruction level of the element (for example, the smoothing capacitor 214*a*) included in the servomotor drive device 2 after exceeding the voltage immediately after the speed reduction of the servomotors 300-1, 300-2, ..., 300-*m* is started, the control unit 406 brings the NPN transistors 402-1, 402-2, 402-3, 402-4, 402-5, 402-6 into the on state in accordance with data from the control unit 207*a*, and the control unit 207*a* brings the NPN transistor 210*a* into the off state. Due to this, the converter 4 returns the regenerative energy generated during speed reduction of the servomotors 300-1, 300-2, ..., 300-*m* to the AC power source 1 side.

When the DC link voltage exceeds a voltage V2 as a second voltage higher than the voltage V1 and lower than the destruction level after exceeding the voltage V1, the control unit 406 brings the NPN transistors 402-1, 402-2, 402-3, 402-4, 402-5, 402-6 into the on state in accordance with data from the control unit 207*a* and the control unit 207*a* brings the NPN transistor 210*a* into the on state. Due to this, the converter 4 returns the regenerative energy generated during speed reduction of the servomotors 300-1, 300-2, ..., 300-*m* to the AC power source 1 side and the regenerative resistor 211*a* consumes the regenerative energy generated during speed reduction of the servomotors 300-1, 300-2, ..., 300-*m*.

When the DC link voltage exceeds a voltage V3 higher than the voltage V2 and lower than the destruction level after exceeding the voltage V2, the control unit 406 brings the NPN transistors 402-1, 402-2, 402-3, 402-4, 402-5, 402-6 into the off state in accordance with data from the control unit 207*a* and aborts the return of the regenerative energy to the AC power source 1 side, and outputs an alarm signal to the upper control device 5 through the multi-core cable 215*a*, the multi-pin connector 205*a*, the control unit 207*a*, and the optical cable 216*a*.

According to the present embodiment, the converter 4 configured to return regenerative energy to the AC power source 1 side is attached to the servomotor drive device 2 in an attachable and detachable manner through the connectors 203*a*, 204*a* and the multi-pin connector 205*a*. Consequently, even when the regenerative energy generated during speed reduction of the servomotors 300-1, 300-2, ..., 300-*m* is larger than the regenerative energy that can be handled by the regenerative resistor 211*a* since the industrial robot 3 is a large-sized or high-speed industrial robot, it is possible to add the power source regeneration function. That is, it is possible to add the power source regeneration function in accordance with the operating conditions of the industrial robot.

Figure 2:
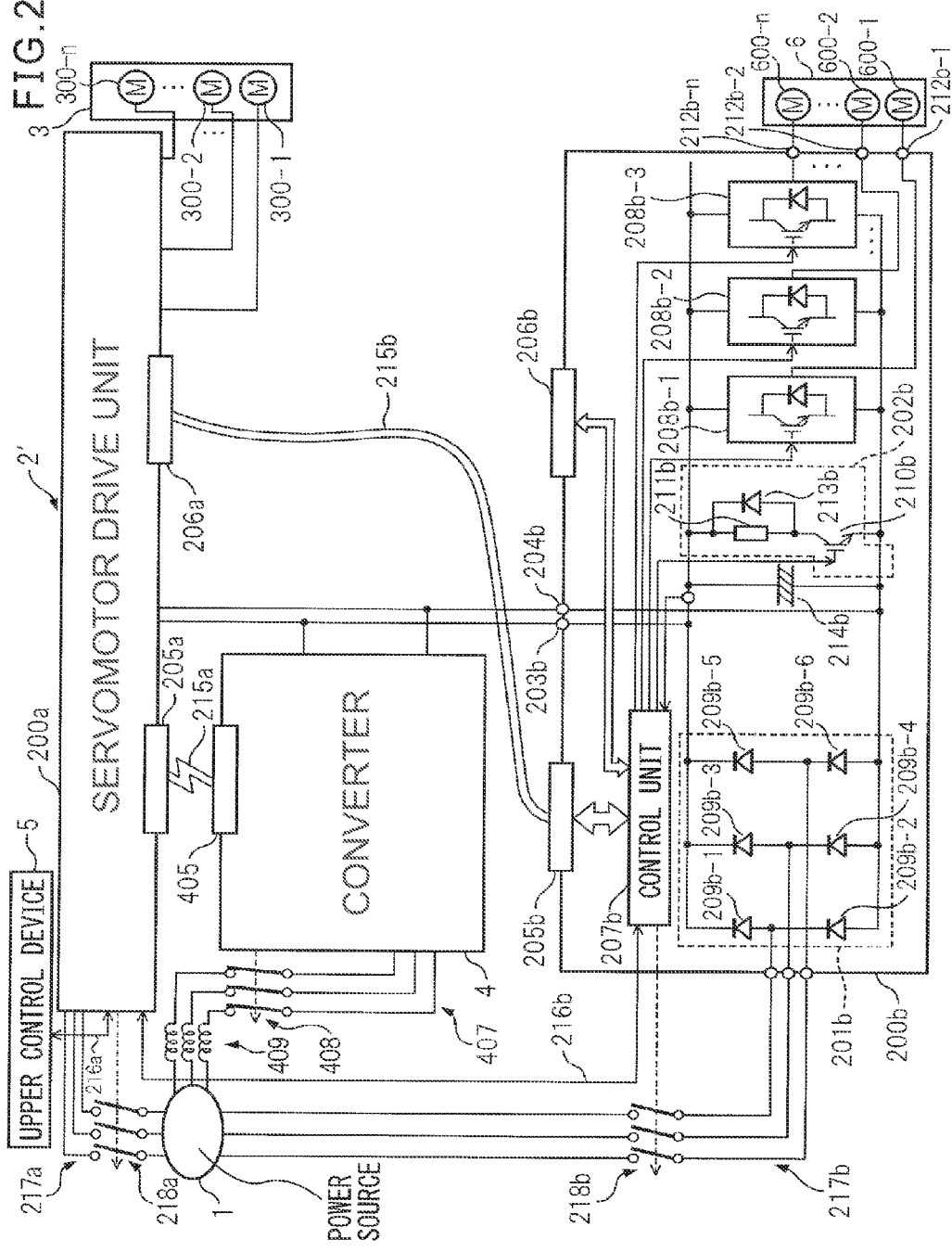
FIG. 2 is a block diagram of a system having a servomotor drive device of a second embodiment of the present invention.

FIG. 2 is a block diagram of a system having a servomotor drive device of a second embodiment of the present invention. The system shown in FIG. 2 is used to drive a servomotor connected to a rotating shaft of a moving part of an industrial robot, and the system has the three-phase AC power source 1, a servomotor drive device 2', the industrial robot 3, 6, the converter 4, and the upper control device 5. In FIG. 2, the three-phase AC power source 1, the industrial robot 3, and the upper control device 5 have the same configurations as those of the three-phase AC power source 1, the industrial robot 3 and the upper control device 5 of the first embodiment shown in FIG. 1, and therefore, explanation thereof is omitted. Further, in FIG. 2, the converter 4 has the same configuration as that of the converter 4 of the first embodiment shown in FIG. 1, and therefore, explanation thereof is omitted and the components of the converter 4 are not shown in FIG. 2 except for the multi-pin connector 405.

In the present embodiment, the servomotor drive device 2' consists of two servomotor drive units, that is, the servomotor drive unit 200*a* and a servomotor drive unit 200*b*. The servomotor drive unit 200*a* has the same configuration as that of the servomotor drive unit 200*a* of the first embodiment shown in FIG. 1, and therefore, explanation thereof is omitted and the components of the servomotor drive unit 200*a* are not shown in FIG. 2, except for the multi-pin connectors 205*a*, 206*a*.

The servomotor drive unit 200*b* has a converter 201*b* as a first converter, a regenerative resistor circuit 202*b*, connectors 203*b* and 204*b* and multi-pin connectors 205*b*, 206*b* such as 8-pin connectors which constitute a first connection part, and a control unit 207*b*.

The converter 201*b* has six diodes 209*b*-1, 209*b*-2, 209*b*-3, 209*b*-4, 209*b*-5, 209*b*-6 bridge-connected as a plurality of first rectifier elements configured to supply DC power to the number n (n is an arbitrary natural number) of inverters 208*b*-1, 208*b*-2, ..., 208*b*-*n* connected in parallel with one another as a first inverter. Each of the inverters 208*b*-1, 208*b*-2, ..., 208*b*-*n* converts DC power supplied from the converter 201*b* into AC power.

The regenerative resistor circuit 202*b* is connected in parallel to the converter 201*b* and has an NPN transistor (IGBT) 210*b*, which is a feedback transistor, as a first switching element and a regenerative resistor 211*b*. The regenerative resistor 211*b* consumes regenerative energy generated during speed reduction of servomotors 600-1, 600-2, ..., 600-*n* connected to a rotating shaft of a moving part (for example, an arm) of the industrial robot 6 when the NPN transistor 210*b* is in the on state. The servomotors 600-1, 600-2, ..., 600-*n* are connected in series to the inverters 208*b*-1, 208*b*-2, ..., 208*b*-*n*, respectively, via connectors 212*b*-1, 212*b*-2, ..., 212*b*-*n*. In the present embodiment, a diode 213*b* is connected in parallel to the regenerative resistor 211*b* and a smoothing capacitor 214*b* is connected in parallel to the converter 201*b*.

The connectors 203*b* and 204*b* are configured so that two pins (not shown schematically) provided on the DC current output side of the converter 4 can be attached and detached, and when these two pins are inserted into the connectors 203*b* and 204*b*, respectively, the DC power supplied from the converter 4 is supplied to the inverters 208*b*-1, 208*b*-2, ..., 208*b*-*n* side. The multi-pin connectors 205*a* and 206*a* are used to connect to other members through a multi-core cable. In the present embodiment, the multi-pin connector 205*b* connects to the multi-pin connector 205*a* through a multi-core cable 215*b* to enable transmission and reception of data between the control unit 207*b* and the control unit 207*a*.

The control unit 207*b* transmits and receives data to and from the control unit 207*a* through an optical fiber 216*b* and in addition thereto, the control unit 207*b* transmits and receives data to and from the control unit 207*a* through the multi-pin connector 205*b*, the multi-core cable 215*b*, and the multi-pin connector 206*a* and controls the on and off operation of the NPN transistor 210*b*, the drive of the inverters 208*b*-1, 208*b*-2, ..., 208*b*-*n*, and the on and off operation of a switch 218*b* arranged in a line 217*b* between the three-phase AC power source 1 and the converter 201*b*. To do this, the control unit 207*b* is implemented by a processor including an input/output port, a serial communication circuit, a comparator, etc., and performs various kinds of processing of the servomotor drive unit 200*b* in accordance with processing programs stored in a memory, not shown schematically. In the present embodiment, the control unit 207*b* detects the voltage across both ends of the smoothing capacitor 214b, that is, the DC link voltage, in order to detect the voltage across both ends of the converter 201b or the voltage across both ends of the inverters 208b-1, 208b-2, . . . , 208b-n.

When the converter 4 is not attached to the servomotor drive device 2', the control unit 207a detects the state where the converter 4 is not connected to the multi-pin connector 205a, and at the time of driving of the servomotors 300-1, 300-2, . . . , 300-m, the control unit 207a brings the switch 218a into the on state in accordance with a command from the upper control device 5. At this time, the control unit 207b detects the state where the converter 4 is not connected to the multi-pin connector 205a in accordance with data from the control unit 207a, and at the time of driving of the servomotors 600-1, 600-2, . . . , 600-n, the control unit 207b brings the switch 218b into the on state in accordance with data from the control unit 207a. Due to this, the converter 201a converts an AC current from the three-phase AC power source 1 into a DC current and supplies DC power to the inverters 208a-1, 208a-2, . . . , 208a-m, and the converter 201b converts an AC current from the three-phase AC power source 1 into a DC current and supplies DC power to the inverters 208b-1, 208b-2, . . . , 208b-n.

When the servomotors 300-1, 300-2, . . . , 300-m, 600-1, 600-2, . . . , 600-n are driven to reduce speed in the state where the converter 4 is not attached to the servomotor drive device 2', the control unit 207a brings the NPN transistor 210a into the on state and the control unit 207b brings the NPN transistor 210b into the on state. Due to this, the regenerative resistor 211a consumes the regenerative energy generated during speed reduction of the servomotors 300-1, 300-2, . . . , 300-m and the regenerative resistor 211b consumes the regenerative energy generated during speed reduction of the servomotors 600-1, 600-2, . . . , 600-n.

When the converter 4 is attached to the servomotor drive device 2' via the connectors 203a, 203b, 204a, and 204b and the multi-pin connector 205a, the control unit 207a detects the state where the converter 4 is connected to the multi-pin connector 205a, and the control unit 207b detects the state where the converter 4 is connected to the multi-pin connector 205a in accordance with data from the control unit 207a. Then, at the time of driving of the servomotors 300-1, 300-2, . . . , 300-m, 600-1, 600-2, . . . , 600-n, the control unit 207a brings the switch 218a into the off state in accordance with a command from the upper control device 5, the control unit 207b brings the switch 218b into the off state in accordance with data from the control unit 207a, and the control unit 406 brings the switch 408 into the on state in accordance with data from the control unit 207a. Due to this, the converter 4 converts an AC current from the three-phase AC power source 1 into a DC current and supplies DC power to the inverters 208a-1, 208a-2, . . . , 208a-m, 208b-1, 208b-2, . . . , 208b-n.

When the servomotors 300-1, 300-2, . . . , 300-m, 600-1, 600-2, . . . , 600-n are driven to reduce speed in the state where the converter 4 is attached to the servomotor drive device 2', the control units 207a, 207b monitor the DC link voltage of the servomotor drive units 200a and 200b, respectively.

When the DC link voltage exceeds the voltage V1 as the first voltage lower than the destruction level of the element (for example, the smoothing capacitors 214a, 214b) included in the servomotor drive device 2 after exceeding the voltage immediately after the speed reduction of the servomotors 300-1, 300-2, . . . , 300-m, 600-1, 600-2, . . . , 600-n is started, the control unit 405 brings the NPN transistors 402-1, 402-2, 402-3, 402-4, 402-5, and 402-6 into the on state in accordance with data from the control unit 207a, the control unit 207a brings the NPN transistor 210a into the off state, and the control unit 207b brings the NPN transistor 210b into the off state in accordance with data from the control unit 207a. Due to this, the converter 4 returns the regenerative energy generated during speed reduction of the servomotors 300-1, 300-2, . . . , 300-m, 600-1, 600-2, . . . , 600-n to the AC power source 1 side.

When the DC link voltage exceeds the voltage V2 as the second voltage higher than the voltage V1 and lower than the destruction level after exceeding the voltage V1, the control unit 405 brings the NPN transistors 402-1, 402-2, 402-3, 402-4, 402-5, 402-6 into the on state in accordance with data from the control unit 207a, the control unit 207a brings the NPN transistor 210a into the on state, and the control unit 207b brings the NPN transistor 210b into the on state in accordance with data from the control unit 207a. Due to this, the converter 4 returns the regenerative energy generated during speed reduction of the servomotors 300-1, 300-2, . . . , 300-m, 600-1, 600-2, . . . , 600-n to the AC power source 1 side, the regenerative resistor 211a consumes the regenerative energy generated during speed reduction of the servomotors 300-1, 300-2, . . . , 300-m, and the regenerative resistor 211b consumes the regenerative energy generated during speed reduction of the servomotors 600-1, 600-2, . . . , 600-n.

When the DC link voltage exceeds the voltage V3 higher than the voltage V2 and lower than the destruction level after exceeding the voltage V2, the control unit 405 brings NPN transistors 402'-1, 402'-2, 402'-3, 402'-4, 402'-5, 402'-6 into the off state in accordance with data from the control unit 207a and aborts the return of the regenerative energy to the AC power source 1 side, and outputs an alarm signal to the upper control device 5 through the multi-core cable 215a, the multi-pin connector 205a, the control unit 207a, and the optical cable 216a.

According to the present embodiment, the converter 4 configured to return regenerative energy to the AC power source 1 side is attached to the servomotor drive device 2' in an attachable and detachable manner through the connectors 203a, 203b, 204a, 204b and the multi-pin connector 205a. Consequently, even when the regenerative energy generated during speed reduction of the servomotors 300-1, 300-2, . . . , 300-m, 600-1, 600-2, . . . , 600-n is larger than the regenerative energy that can be handled by the regenerative resistors 211a and 210b since the two industrial robots 3, 6 are operated, it is possible to add the power source regeneration function. That is, it is possible to add the power source regeneration function in accordance with the operating conditions of the industrial robot.

Figure 3:
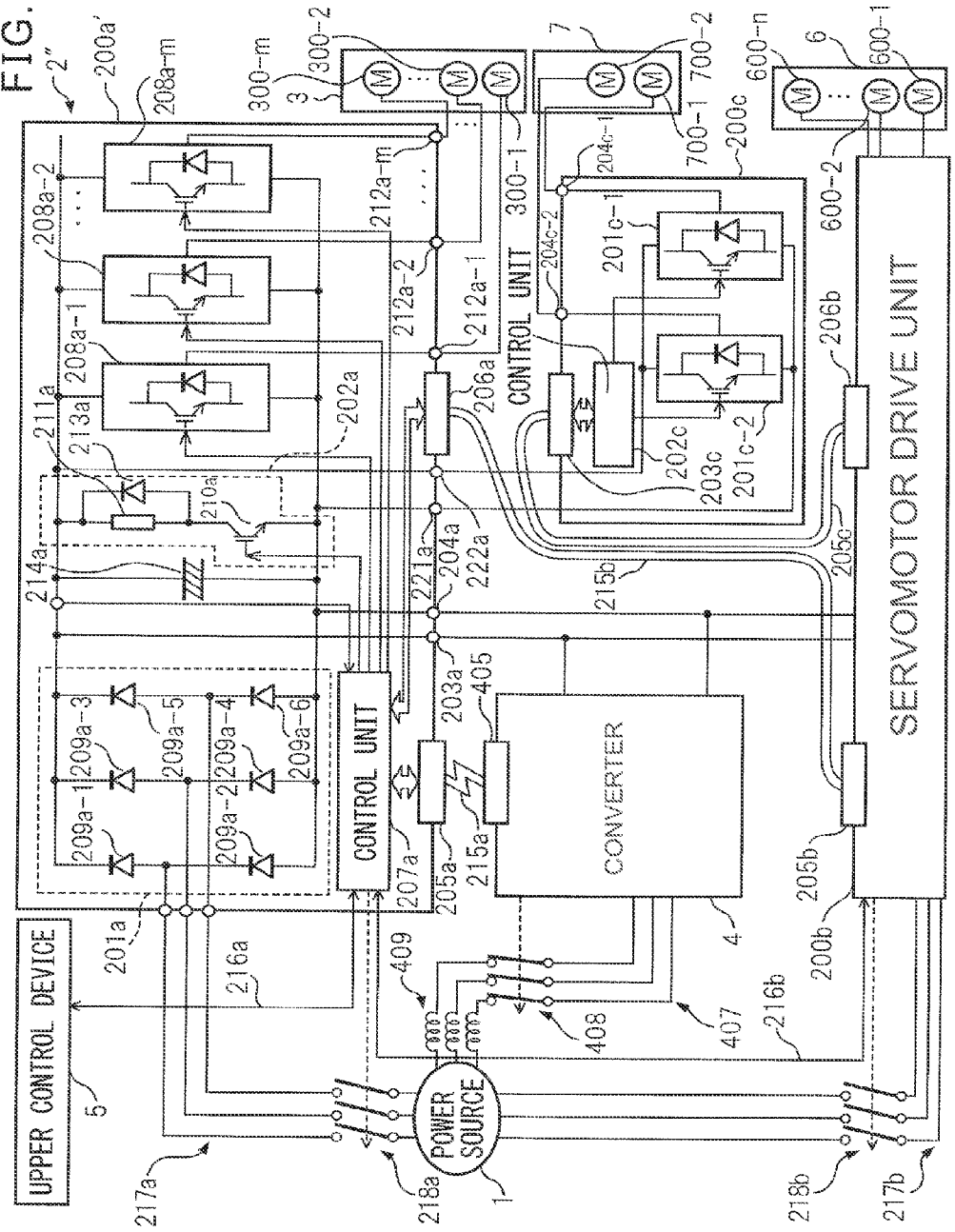
FIG. 3 is a block diagram of a system having a servomotor drive device of a third embodiment of the present invention.

FIG. 3 is a block diagram of a system having a servomotor drive device of a third embodiment of the present invention. The system shown in FIG. 3 is used to drive a servomotor connected to a rotating shaft of a moving part of an industrial robot, and the system has the three-phase AC power source 1, a servomotor drive device 2", the industrial robots 3, 6, the converter 4, the upper control device 5, and a peripheral 7 of the industrial robot 3. In FIG. 3, the three-phase AC power source 1, the industrial robots 3, 6 and the upper control device 5 have the same configurations as those of the three-phase AC power source 1, the industrial robots 3 and 6, and the upper control device 5 of the second embodiment shown in FIG. 2, and therefore, explanation thereof is omitted. Further, in FIG. 3, the converter 4 has the same configuration as the converter 4 of the first embodiment shown in FIG. 1, and therefore, explanation thereof is omitted and the components of the converter 4 are not shown in FIG. 3, except for the multi-pin connector 405.

In the present embodiment, the servomotor drive device 2" consists of two servomotors, that is, a servomotor drive unit 200a' and the servomotor drive unit 200b. The servomotor drive unit 200b has the same configuration as that of the servomotor drive unit 200b of the second embodiment shown in FIG. 2, and therefore, explanation thereof is omitted and the components of the servomotor drive unit 200b are not shown in FIG. 3, except for the multi-pin connectors 205b, 206b.

The servomotor drive unit 200a' has connectors 221a and 222a in addition to the converter 201a, the regenerative resistor circuit 202a, the connectors 203a and 204a, the multi-pin connectors 205a, 206a and the control unit 207a, and the connectors 221a, 222a constitute a second connection part (interface) together with a multi-pin connector 223a.

The connectors 221a, 222a are configured so that two pins (not shown schematically) provided on the DC current input side of an inverter unit 200c as a second inverter configured to convert DC power into AC power can be attached and detached. The inverter unit 200c has inverters 201c-1, 201c-2 configured to drive servomotors 700-1, 700-2 connected to a rotating shaft of a moving part of the peripheral 7, a control unit 202c, and a multi-pin connector 203c such as an 8-pin connector. In the present embodiment, the servomotors 700-1, 700-2 are connected in series to the inverters 201c-1, 201c-2, respectively, via connectors 204c-1, 204c-2.

When the two pins provided on the DC current input side of the inverter unit 200c are inserted into the connectors 221a, 222a, respectively, the DC current output from the converter 201 or the converter 4 is supplied to the inverters 201c-1, 201c-2. The multi-pin 203c connects to the multi-pin connector 206b through a multi-core cable 205c to enable transmission and reception of data between the control unit 207a and the control unit 202c. The control unit 202c transmits and receives data to and from the control unit 207a through the multi-pin connector 203c, the multi-core cable 205c, the control unit 207b, the multi-pin connector 205b, the multi-core cable 215b and the multi-pin connector 206a, and controls the drive of the inverters 201c-1, 201c-2. To do this, the control unit 202c is implemented by a processor having an input/output port, a serial communication circuit, a comparator, etc., and performs various kinds of processing of the inverter unit 200c in accordance with processing programs stored in a memory, not shown schematically.

When the converter 4 is not attached to the servomotor drive device 2", the control unit 207a detects the state where the converter 4 is not connected to the multi-pin connector 205a, and at the time of driving of the servomotors 300-1, 300-2, . . . , 300-m, 700-1, 700-2, the control unit 207a brings the switch 218a into the on state in accordance with a command from the upper control device 5. At this time, the control unit 207b detects the state where the converter 4 is not connected to the multi-pin connector 205b in accordance with data from the control unit 207a, and at the time of driving of the servomotors 600-1, 600-2, . . . , 600-n, the control unit 207b brings the switch 218b into the on state in accordance with data from the control unit 207a. Due to this, the converter 201a converts an AC current from the three-phase AC power source 1 into a DC current and supplies DC power to the inverters 208a-1, 208a-2, . . . , 208a-m, 201c-1, 201c-2, and the converter 201b converts an AC current from the three-phase AC power source 1 into a DC current and supplies DC power to the inverters 208b-1, 208b-2, . . . , 208b-n.

When the servomotors 300-1, 300-2, . . . , 300-m, 600-1, 600-2, . . . , 600-n, 700-1, 700-2 are driven to reduce speed in the state where the converter 4 is not attached to the servomotor drive device 2", the control unit 207a brings the NPN transistor 210a into the on state, and the control unit 207b brings the NPN transistor 210b into the on state in accordance with data from the control unit 207a. Due to this, the regenerative resistor 211a consumes the regenerative energy generated during speed reduction of the servomotors 300-1, 300-2, . . . , 300-m, 700-1, 700-2, and the regenerative resistor 211b consumes the regenerative energy generated during speed reduction of the servomotors 600-1, 600-2, . . . , 600-n.

When the converter 4 is attached to the servomotor drive device 2" via the connectors 203a, 203b, 204a, 204b and the multi-pin connector 205a, the control unit 207a detects the state where the converter 4 is connected to the multi-pin connector 205a, and the control unit 207b detects the state where the converter 4 is connected to the multi-pin connector 205b in accordance with data from the control unit 207a. Then, at the time of driving of the servomotors 300-1, 300-2, . . . , 300-m, 600-1, 600-2, . . . , 600-n, 700-1, 700-2, the control unit 207a brings the switch 218a into the off state in accordance with a command from the upper control unit device 5, the control unit 207b brings the switch 218b into the off state in accordance with data from the control unit 207a, and the control unit 406 brings the switch 408 into the on state in accordance with data from the control unit 207a. Due to this, the converter 4 converts an AC current from the three-phase AC power source 1 into a DC current and supplies DC power to the inverters 201c-1, 201c-2 and inverters 207a-1, 207a-2, . . . , 207a-m, 207b-1, 207b-2, . . . , 207b-n.

When the servomotors 300-1, 300-2, . . . , 300-m, 600-1, 600-2, . . . , 600-n, 700-1, 700-2 are driven to reduce speed in the state where the converter 4 is attached to the servomotor drive device 2", the control units 207a and 207b monitor the DC link voltage of the servomotor drive units 200a, 200b, respectively.

When the DC link voltage exceeds the voltage V1 as the first voltage lower than the destruction level of the element (for example, the smoothing capacitors 214a and 214b) included in the servomotor drive device 2 after exceeding the voltage immediately after the speed reduction of the servomotors 300-1, 300-2, . . . , 300-m, 600-1, 600-2, . . . , 600-n, 700-1, 700-2 is started, the control unit 406 brings the NPN transistors 402-1, 402-2, 402-3, 402-4, 402-5, 402-6 into the on state in accordance with data from the control units 207a, 207b, the control unit 207a brings the NPN transistor 210a into the off state, and the control unit 207b brings the NPN transistor 210b into the off state. Due to this, the converter 4 returns the regenerative energy generated during speed reduction of the servomotors 300-1, 300-2, . . . , 300-m, 600-1, 600-2, . . . , 600-n, 700-1, 700-2 to the AC power source 1 side.

When the DC link voltage exceeds the voltage V2 as the second voltage higher than the voltage V1 and lower than the destruction level after exceeding the voltage V1, the control unit 406 brings the NPN transistors 402-1, 402-2, 402-3, 402-4, 402-5, 402-6 into the on state in accordance with data from the control unit 207a, the control unit 207a brings the NPN transistor 210a into the on state, and the control unit 207b brings the NPN transistor 210b into the on state. Due to this, the converter 4 returns the regenerative energy generated during speed reduction of the servomotors 300-1, 300-2, . . . , 300-m, 600-1, 600-2, . . . , 600-n, 700-1, 700-2 to the AC power source 1 side, the regenerative resistor 211a consumes the regenerative energy generated during speed reduction of the servomotors 300-1, 300-2, . . . , 300-m, 700-1, 700-2, and the regenerative resistor 211b consumes the regenerative energy generated during speed reduction of the servomotors 600-1, 600-2, . . . , 600-n.

When the DC link voltage exceeds the voltage V3 higher than the voltage V2 and lower than the destruction level after exceeding the voltage V2, the control unit 406 brings the NPN transistors 402-1, 402-2, 402-3, 402-4, 402-5, 402-6 into the off state and aborts the return of the regenerative energy to the AC power source 1 side, and outputs an alarm signal to the upper control device 5.

According to the present embodiment, the converter 4 configured to return regenerative energy to the AC power source 1 side is attached to the servomotor drive device 2'' in an attachable and detachable manner through the connectors 203*a*, 203*b*, 204*a*, 204*b* and the multi-pin connector 206*a*. Consequently, even when the regenerative energy generated during speed reduction of the servomotors 300-1, 300-2, ..., 300-*m*, 600-1, 600-2, ..., 600-*n*, 700-1, 700-2 is larger than the regenerative energy that can be handled by the regenerative resistors 211*a* and 210*b* since the two industrial robots 3 and 6 and the peripheral 7 are operated, it is possible to add the power source regeneration function. That is, it is possible to add the power source regeneration function in accordance with the operating conditions of the industrial robot.

Figure 4:
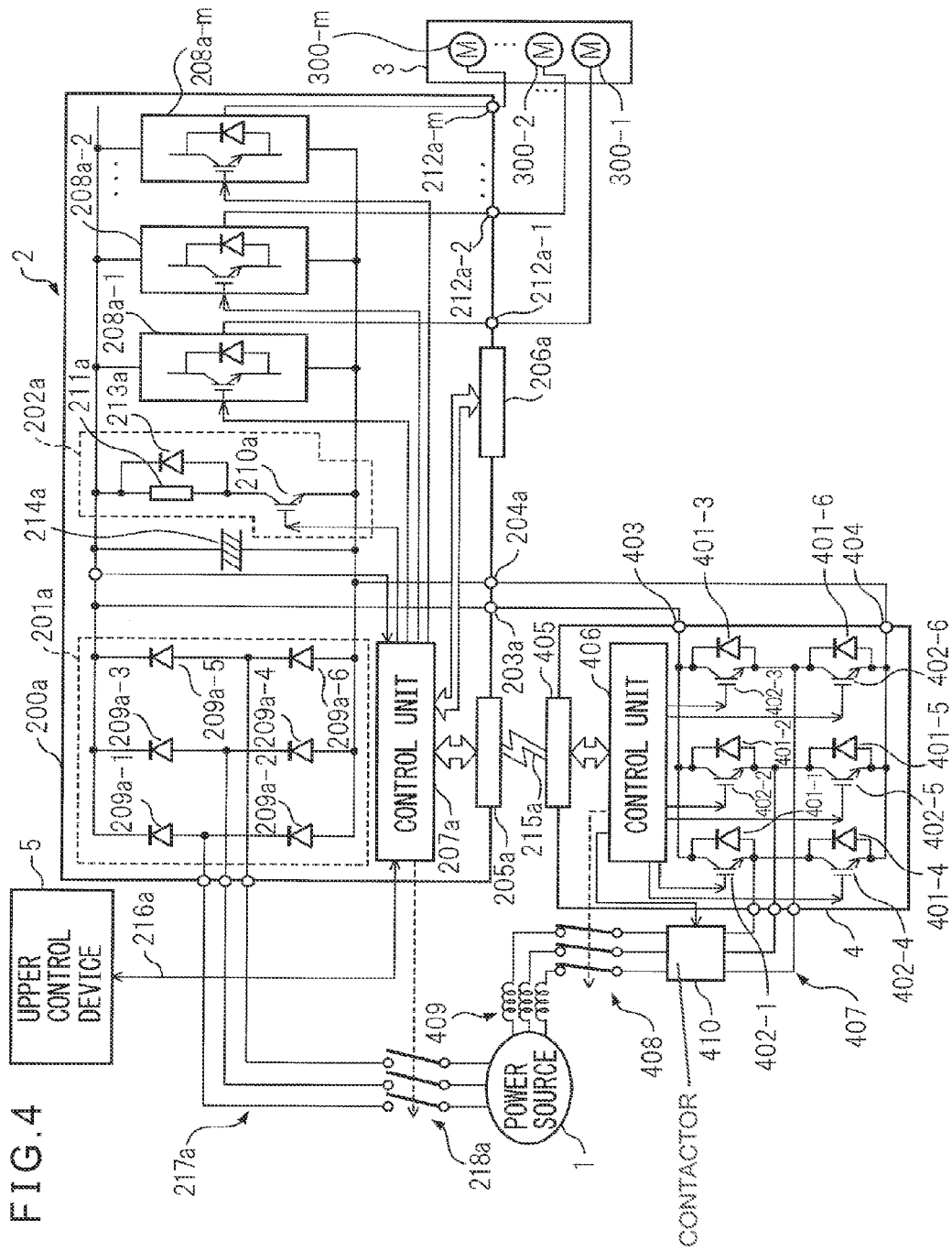
FIG. 4 is a block diagram of a system having a servomotor drive device of a fourth embodiment of the present invention.

FIG. 4 is a block diagram of a system having a servomotor drive device of a fourth embodiment of the present invention. The system shown in FIG. 4 is used to drive a servomotor connected to a rotating shaft of a moving part of an industrial robot, and the system has the three-phase AC power source 1, the servomotor drive device 2, the industrial robot 3, the converter 4, and the upper control device 5. In FIG. 4, the three-phase AC power source 1, the servomotor drive device 2, the industrial robot 3, the converter 4, and the upper control device 5 have the same configurations as those of the three-phase AC power source 1, the servomotor drive device 2, the industrial robot 3, the converter 4, and the upper control device 5 of the first embodiment shown in FIG. 1, and therefore, explanation thereof is omitted.

In the present embodiment, a contactor 410 is arranged between the AC power source 1 and the converter 4, and when the disconnection of the contactor 410 is detected while the converter 4 returns regenerative energy to the AC power source 1 side, the control unit 406 brings the NPN transistors 402-1, 402-2, 402-3, 402-4, 402-5, 402-6 into the off state and the control unit 207*a* brings the NPN transistor 210*a* into the on state. In order to detect the disconnection of the contact 410 since it is not possible to return regenerative energy to the AC power source 1 side, the control unit 406 receives an emergency stop command by a user's operation through the upper control device 5, receives an off command from the control unit 406, or monitors an auxiliary contact of the contactor 410 by the control unit 406, for example.

According to the present embodiment, it is possible to abort power source regeneration if regenerative energy cannot be returned to the AC power source 1 side since the contactor 410 is disconnected, and therefore, it is possible to reduce the speed of the motors 300-1, 300-2, ..., 300-*m* and stop them in a safe manner.

The present invention is not limited to the above-mentioned embodiments and there can be a number of alterations and modifications. For example, it is possible to use an AC power source other than the three-phase AC power source as the AC power source. Further, in the above-mentioned embodiments, the servomotor drive device having one or two servomotor drive units is explained, however, it is possible to also apply the present invention to a servomotor drive device having three or more servomotor drive units.

In the above-mentioned embodiments, the servomotor drive device having one peripheral is explained, however, it is possible to also apply the present invention to a servomotor drive device having two or more peripherals.

Further, in the above-mentioned embodiments, the case where the line in which a switch is arranged is used is explained, however, it is possible to use a cable that connects the AC power source and the first converter or the second converter as a line. In this case, when the cable connects the AC power source to the first converter, the AC power is supplied to the first converter from the AC power source, and when the cable connects the AC power source to the second converter, the AC power is supplied to the second converter from the AC power source.

The invention claimed is:

1. A servomotor drive device comprising:
   a first converter having a plurality of first rectifier elements configured to convert an AC current from an AC power source into a DC current and to supply DC power to a first inverter configured to convert DC power into AC power;
   a regenerative resistor circuit connected in parallel to the first converter and having a first switching element and a regenerative resistor configured to consume regenerative energy generated during speed reduction of a servomotor connected in series to the first inverter and connected to a rotating shaft of a moving part of an industrial robot when the first switching element is in the on state;
   a first connection part configured to connect a second converter in parallel to the regenerative resistor circuit in an attachable and detachable manner; and
   a first control unit configured to control the on and off states of the first switching element, wherein
   the second converter has:
      a plurality of second rectifier elements configured to convert an AC current from an AC power source into a DC current and to supply DC power to the first inverter;
      second switching elements in the same number as that of the plurality of second rectifier elements, connected in parallel to the plurality of second rectifier elements, respectively; and
      a second control unit configured to return the regenerative energy to the AC power source side by bringing the second switching element into the on state when the second converter is connected to the first connection part.

2. The servomotor drive device according to claim 1, further comprising:
   a second connection part configured to connect a second inverter in an attachable and detachable manner, the second inverter configured to convert DC power into AC power to drive a servomotor connected to a rotating shaft of a peripheral of an industrial robot.

3. The servomotor drive device according to claim 1, wherein the first control unit keeps the first switching element in the off state and the second control unit keeps the second switching element in the on state if the second converter is connected to the first connection part and the voltage across both ends of the first inverter or the voltage across both ends of the second converter is between a first voltage, which exceeds the voltage immediately after the speed reduction of the servomotor is started and is lower than a voltage of destruction level of an element included in the servomotor drive device, and a second voltage, which exceeds the first voltage and is lower than the voltage of destruction level.

4. The servomotor drive device according to claim 3, wherein the first control unit keeps the first switching element in the on state and the second control unit keeps the second switching element in the on state until the voltage across both ends of the first inverter or the voltage across both ends of the second converter exceeds the second voltage and then the voltage reaches the voltage of destruction level.

5. The servomotor drive device according to claim 1, wherein the second control unit brings the second switching element into the off state if the disconnection of a contactor arranged between the AC power source and the second converter is detected while the second converter returns the regenerative energy to the AC power source side.

6. A servomotor drive device comprising a plurality of servomotor drive units, each of the plurality of servomotor drive units including:
   a first converter having a plurality of first rectifier elements configured to convert an AC current from an AC power source into a DC current and to supply DC power to a first inverter configured to convert DC power into AC power;
   a regenerative resistor circuit connected in parallel to the first converter and having a first switching element and a regenerative resistor configured to consume regenerative energy generated during speed reduction of a servomotor connected in series to the first inverter and connected to a rotating shaft of a moving part of an industrial robot when the first switching element is in the on state;
   a first connection part configured to connect a second converter in parallel to the regenerative resistor circuit in an attachable and detachable manner; and
   a first control unit configured to control the on and off states of the first switching elements, wherein
   the second converter has:
      a plurality of second rectifier elements configured to convert an AC current from an AC power source into a DC current and to supply DC power to the first inverter;
      second switching elements in the same number as that of the plurality of second rectifier elements, connected in parallel to the plurality of second rectifier elements, respectively; and
      a second control unit configured to return the regenerative energy to the AC power source side by bringing the second switching element into the on state when the second converter is connected to all the first connection parts of the plurality of servomotor drive units.

7. The servomotor drive device according to claim 6, further comprising:
   a second connection part configured to connect a second inverter in an attachable and detachable manner, the second inverter configured to convert DC power into AC power to drive a servomotor connected to a rotating shaft of a peripheral of an industrial robot.

8. The servomotor drive device according to claim 6, wherein the first control unit keeps the first switching element in the off state and the second control unit keeps the second switching element in the on state if the second converter is connected to the first connection part and the voltage across both ends of the first inverter or the voltage across both ends of the second converter is between a first voltage, which exceeds the voltage immediately after the speed reduction of the servomotor is started and is lower than a voltage of destruction level of an element included in the servomotor drive device, and a second voltage, which exceeds the first voltage and is lower than the voltage of destruction level.

9. The servomotor drive device according to claim 8, wherein the first control unit keeps the first switching element in the on state and the second control unit keeps the second switching element in the on state until the voltage across both ends of the first inverter or the voltage across both ends of the second converter exceeds the second voltage and then the voltage reaches the voltage of destruction level.

10. The servomotor drive device according to claim 6, wherein the second control unit brings the second switching element into the off state if the disconnection of a contactor arranged between the AC power source and the second converter is detected while the second converter returns the regenerative energy to the AC power source side.

* * * * *